(12) United States Patent
Konstadinidis et al.

(10) Patent No.: US 11,275,206 B2
(45) Date of Patent: Mar. 15, 2022

(54) OPTICAL FIBER COATINGS

(71) Applicant: OFS FITEL, LLC, Norcross, GA (US)

(72) Inventors: Kariofilis Konstadinidis, Decatur, GA (US); Debra A Simoff, Simsbury, CT (US)

(73) Assignee: OFS FITEL, LLC, Norcross, GA (US)

( * ) Notice: Subject to any disclaimer, the term of this patent is extended or adjusted under 35 U.S.C. 154(b) by 8 days.

(21) Appl. No.: 16/929,209

(22) Filed: Jul. 15, 2020

(65) Prior Publication Data

US 2022/0019017 A1   Jan. 20, 2022

(51) Int. Cl.
*G02B 6/02* (2006.01)
*G02B 6/44* (2006.01)

(52) U.S. Cl.
CPC ....... *G02B 6/02395* (2013.01); *G02B 6/4403* (2013.01)

(58) Field of Classification Search
CPC .................. G02B 6/02395; G02B 6/4403
USPC .......................................... 385/114
See application file for complete search history.

(56) References Cited

U.S. PATENT DOCUMENTS

| 2002/0106173 | A1* | 8/2002 | Stupak | C03C 25/12 |
| | | | | 385/128 |
| 2010/0092140 | A1* | 4/2010 | Overton | G02B 6/02395 |
| | | | | 385/112 |
| 2017/0158862 | A1* | 6/2017 | DeRosa | C09D 4/00 |
| 2017/0242209 | A1* | 8/2017 | Tachibana | G02B 6/02395 |
| 2020/0225404 | A1* | 7/2020 | Bickham | G02B 6/02395 |

* cited by examiner

*Primary Examiner* — Jerry M Blevins
(74) *Attorney, Agent, or Firm* — Sam S. Han, Esq.

(57) ABSTRACT

An optical fiber comprising a core, a cladding disposed about the core, and a primary coating disposed about the cladding. The primary coating is cured during draw to at least eighty-five percent (85%) of the primary coating's fully cured primary-coating in situ modulus (P-ISM) value.

20 Claims, 6 Drawing Sheets

OPTICAL FIBER COATINGS

BACKGROUND

Field of the Disclosure

The present disclosure relates generally to fiber optics and, more particularly, to coatings for glass optical fibers.

Description of Related Art

Typically, a dual-layer polymer coating is applied to an optical fiber during fiber draw and each coating layer cures to a certain extent during the fiber-draw process. Generally, the primary (inner) coating is designed to have a relatively low elastic modulus in order to cushion the glass against bending, while the secondary (outer) coating has a higher elastic modulus in order to impart resistance to mechanical forces such as abrasion, compression, and shear. One goal during fiber draw, among others, is to obtain an acceptable in situ modulus (ISM) for the primary coating without sacrificing manufacturing draw speeds.

SUMMARY

The present disclosure provides systems and methods for curing optical fiber coatings during fiber draw. Briefly described, one embodiment comprises an optical fiber comprising a core, a cladding disposed about the core, and a dual-layer coating (primary and secondary) disposed about the cladding. The primary coating is disposed about the cladding at a draw speed of at least ten meters-per-second (10 m/s). The primary coating is cured during draw to at least eighty-five percent (85%) of the coating's fully cured primary-coating in situ modulus (P-ISM) value.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
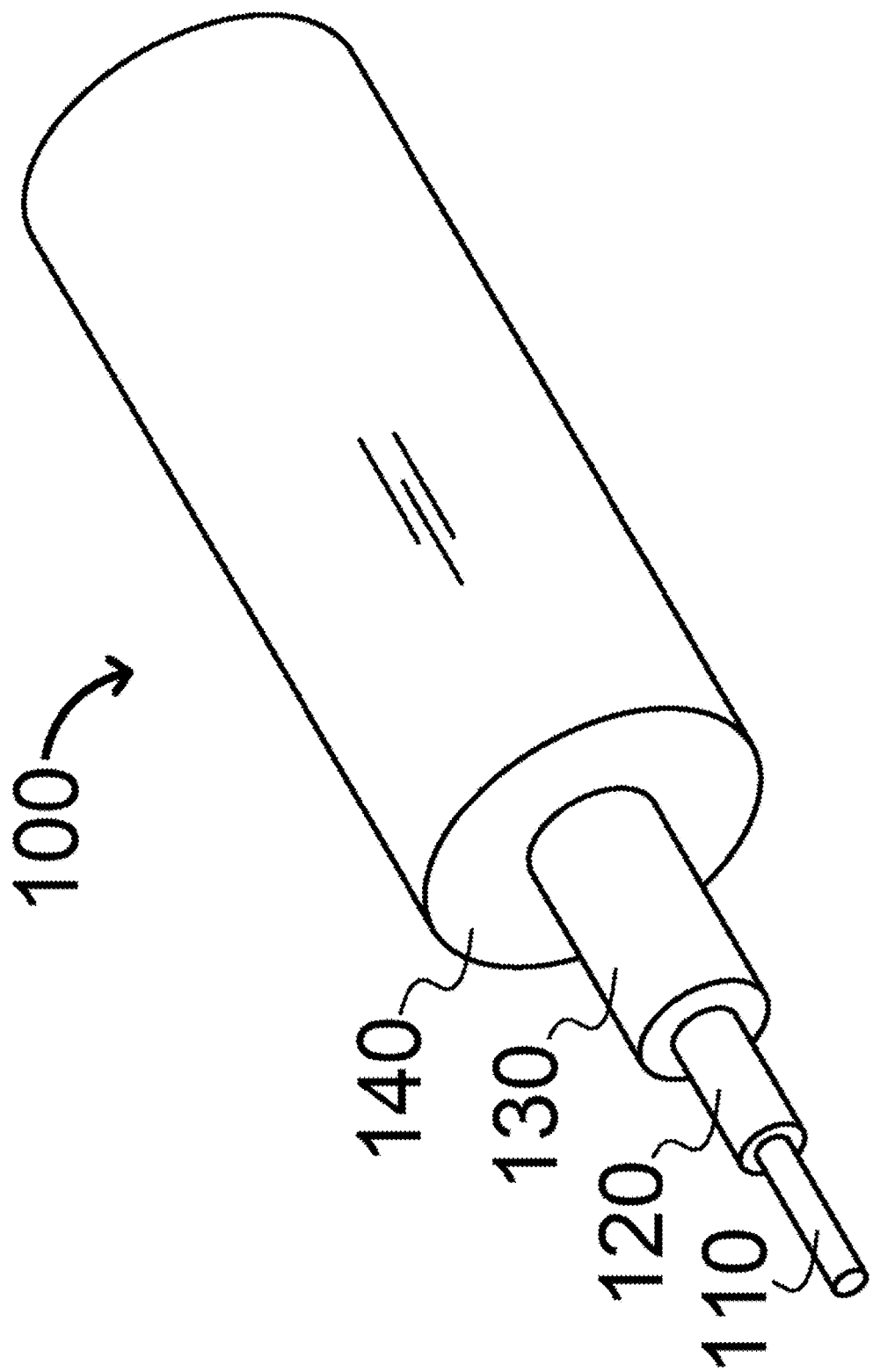
FIG. 1 is a diagram showing one embodiment of an optical fiber with both a primary coating and a secondary coating.

Optical fibers are drawn at line speeds (or draw speeds) that can exceed ten (10), twenty (20), thirty (30), or even fifty (50) meters-per-second (m/s). Typically, one or more coatings are applied to the optical fibers during fiber draw. Conventional wisdom teaches that the coatings cure sufficiently during draw that the coating properties do not change significantly after draw.

Recently, however, the inventors discovered that additional exposure of the optical fibers to ultraviolet (UV) radiation during manufacturing of rollable ribbons (RR) can increase drastically the primary-coating in situ modulus (or primary in situ modulus (P-ISM)) of the optical fibers. The increase in P-ISM, in turn, affects optical attenuation properties of the fibers.

Specifically, during one process for the manufacture of RR, a small amount of UV-curable adhesive (matrix) is applied between the optical fibers and cured with UV radiation. Unlike flat ribbons, which have a UV-curable matrix that encapsulates the optical fibers and therefore reduces UV effects during matrix application (by absorbing the majority of UV light and blocking it from reaching the primary), there is (for some processes) no enveloping or surrounding matrix that reduces the UV effects for RR. Consequently, the primary and secondary coatings on the optical fibers are further exposed to UV during the RR manufacturing process. The further UV exposure of the primary coating results in a significant increase in the primary-coating ISM (P-ISM), which in turn increases sensitivity to micro-bending and, thus, negatively affects the attenuation characteristics of the optical fibers.

To mitigate these and other adverse effects that are caused by post-draw changes in the P-ISM, this disclosure teaches systems and processes for more-fully curing the coatings on the optical fibers. Specifically, this disclosure teaches optical fibers with coatings that are cured to at least eighty-five percent (85%) of a fully cured primary in situ modulus (P-ISM) value for the optical fiber. In other words, the disclosed optical fibers have a primary coating that, when exposed to additional post-draw UV radiation, will have a P-ISM value that increases by less than fifteen percent (<15%). This can be accomplished by exposing the optical fibers to additional UV radiation during the fiber draw process (while the coating is still hot, which, as explained later, favors polymerization reactions that result in lower modulus), thereby further curing (and stabilizing the cure level of) the coatings during draw.

Having provided a broad technical solution to a technical problem, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

For purposes of clarity, throughout this disclosure, a coating that is cured to at least eighty-five percent (85%) of a fully cured primary-coating in situ modulus (P-ISM) value is expressly defined as a coating that has been cured so that the P-ISM value of the coating does not increase by more than fifteen percent (15%) when the coated fiber is exposed to a dose of broad spectrum or LED UV radiation of at least one hundred millijoules-per-square-centimeters (100 mJ/cm$^2$) after the fiber draw process. With this express definition in mind, attention is drawn to FIGS. 1 through 6, which further describe various embodiments of the invention.

FIG. 1 is a diagram showing one embodiment of an optical fiber 100 with both a primary coating 130 and a secondary coating 140. As shown in FIG. 1, the optical fiber 100 comprises a core 110 and a cladding 120 disposed about the core 110. An ultraviolet light-curable (UV-curable) primary coating 130 is disposed about the cladding 120 and a UV-curable secondary coating 140 is disposed about the primary coating 130. Typically, the primary coating 130 and the secondary coating 140 are disposed about the cladding 120 during the fiber draw process, which means that each coating 130, 140 is disposed about the cladding 120 while the optical fiber 100 is drawn at a line speed (or draw speed) of at least ten (10), twenty (20), thirty (30), or even fifty (50) meters-per-second (m/s). It should be appreciated that this secondary coating, for some embodiments, is colored. In another embodiment, the optical fiber 100 comprises a tertiary coating (not shown), which is colored and is typically applied in a separate process after draw.

Unlike conventional optical fibers, the primary coating 130 in FIG. 1 is cured during fiber draw to at least eighty-five percent (85%) of a fully cured primary-coating in situ modulus (P-ISM) value of the coating 130. For some embodiments, because the coatings 130, 140 are UV-curable, the coatings 130, 140 are curable to a greater extent than normal by exposing the coatings 130, 140 to additional ultraviolet (UV) radiation during the draw process. By way of example, one way to accomplish the additional UV exposure is by equipping a draw tower with one (1) or more added UV lamps at various locations along the draw tower. The added UV lamps can be either broad spectrum or light-emitting diode (LED), the latter emitting at a narrow UV wavelength range for curing the primary coating. The added UV lamps allow the optical fiber 100 to be exposed to additional UV radiation while the coating is still at elevated temperatures (e.g., greater than approximately one hundred degrees Celsius (~100° C.)) as the fiber 100 is drawn from an optical preform.

It should be appreciated that conventional draw towers had UV lamps that were previously believed to sufficiently cure the primary coating during draw. Although conventional wisdom taught that those currently existing UV lamps achieved a sufficient cure (as measured by Fourier Transform Infrared (FTIR) spectroscopy), this disclosure reveals that this conventional belief was incorrect and that the sufficiency of cure should be determined by post-draw P-ISM stability, that is, by how much P-ISM increases upon exposure to additional UV after the draw process. With this in mind, added UV lamps, for some embodiments, are installed downstream of the already-existing UV lamps (or farther away from the draw furnace than the already-existing UV lamps). In addition to providing a more-complete cure, the added UV lamps can provide heat that is needed to drive polymerization reactions that lower the modulus at full conversion.

Figure 2:
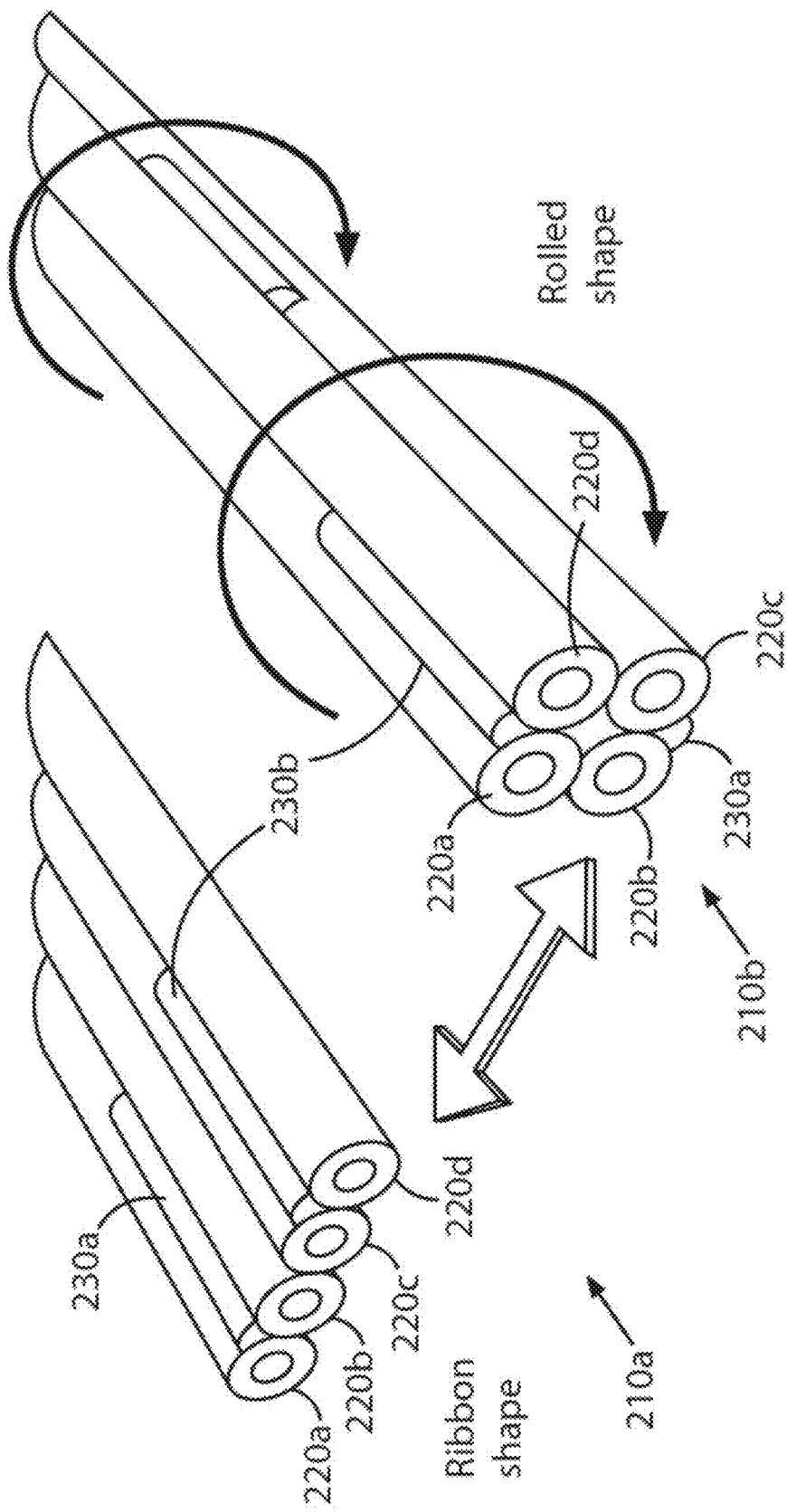
FIG. 2 is a diagram showing one embodiment of a rollable-ribbon (RR) for use in a RR fiber-optic cable.

The optical fiber 100 of FIG. 1 can be used to manufacture rollable-ribbon (RR) fiber-optic cables. Cables containing rollable ribbons (also referred to as partially bonded ribbons) allow manufacturing of cables with higher fiber packing densities than cables incorporating traditional flat ribbons, while still allowing for high-productivity mass fusion splicing of the ribbons during cable installation. As shown in FIG. 2, partial bonds 230a, 230b (collectively designated herein as 230) are disposed at predetermined locations in an array of optical fibers 220a . . . 220d (collectively designated herein as 220). For some embodiments, the partial bond 230 is a UV-curable adhesive that is disposed at predetermined locations in the array, thereby permitting the UV-curable adhesive to flexibly adhere together the adjacent optical fibers 220 at those predetermined locations.

The flexible partial bonds 230 in the rollable ribbon (RR) 210a, 210b (collectively designated herein as 210) allow the RR 210 to be rolled into a roughly cylindrical shape (as shown in FIG. 2) and, thereafter, placed inside of a loose tube or other cable structure (not shown in FIG. 2). This allows the RR 210 to more completely fill the space inside a round cable subunit tube, in contrast to rectangular stacks of flat ribbons that leave more empty spaces within the subunit tube.

Figure 3:
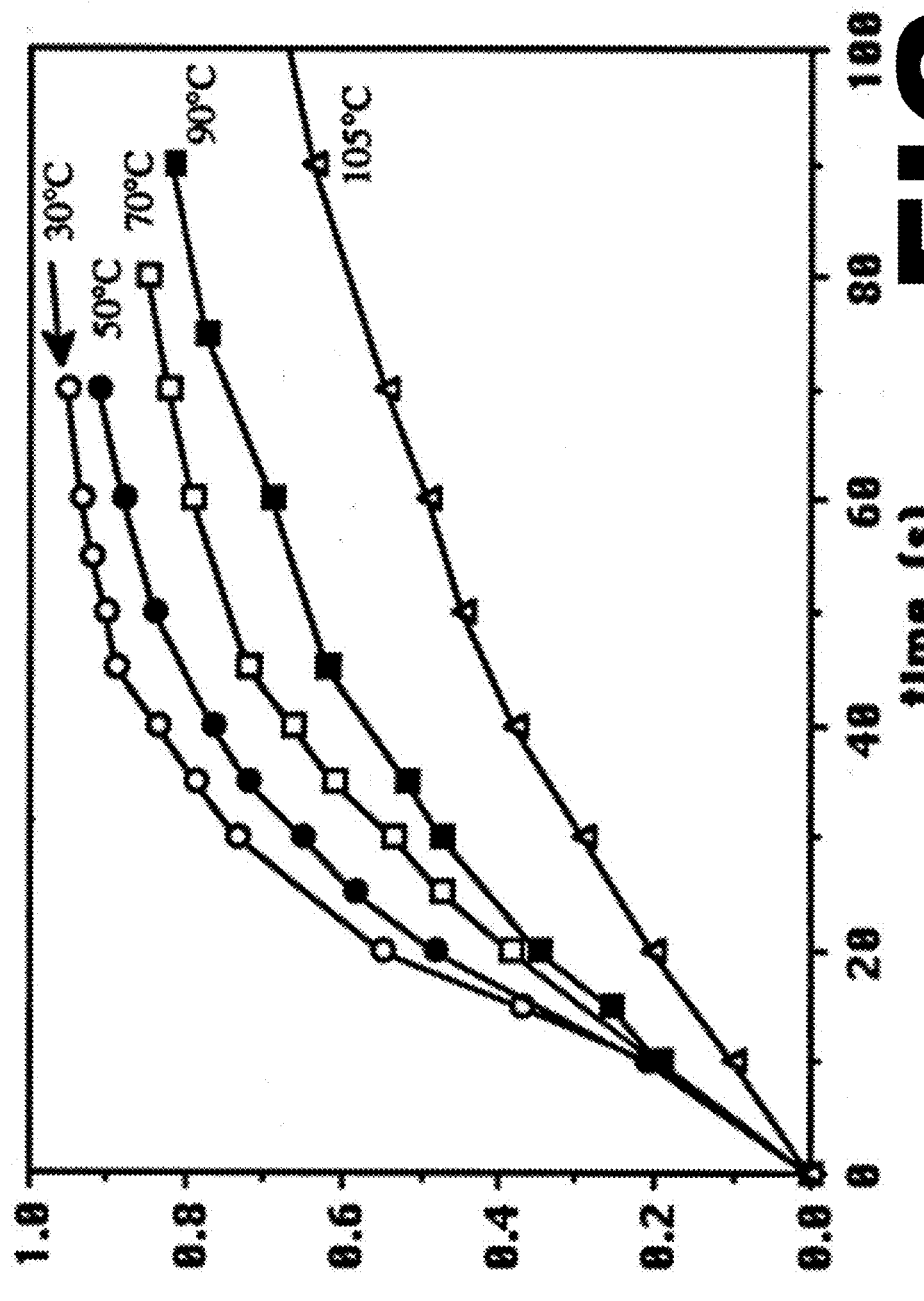
FIG. 3 is a chart showing acrylate conversion (or cure of the coating as measured by Fourier Transform Infrared (FTIR) Spectroscopy) as a function of ultraviolet (UV) irradiation time at different temperatures.
Figure 4:
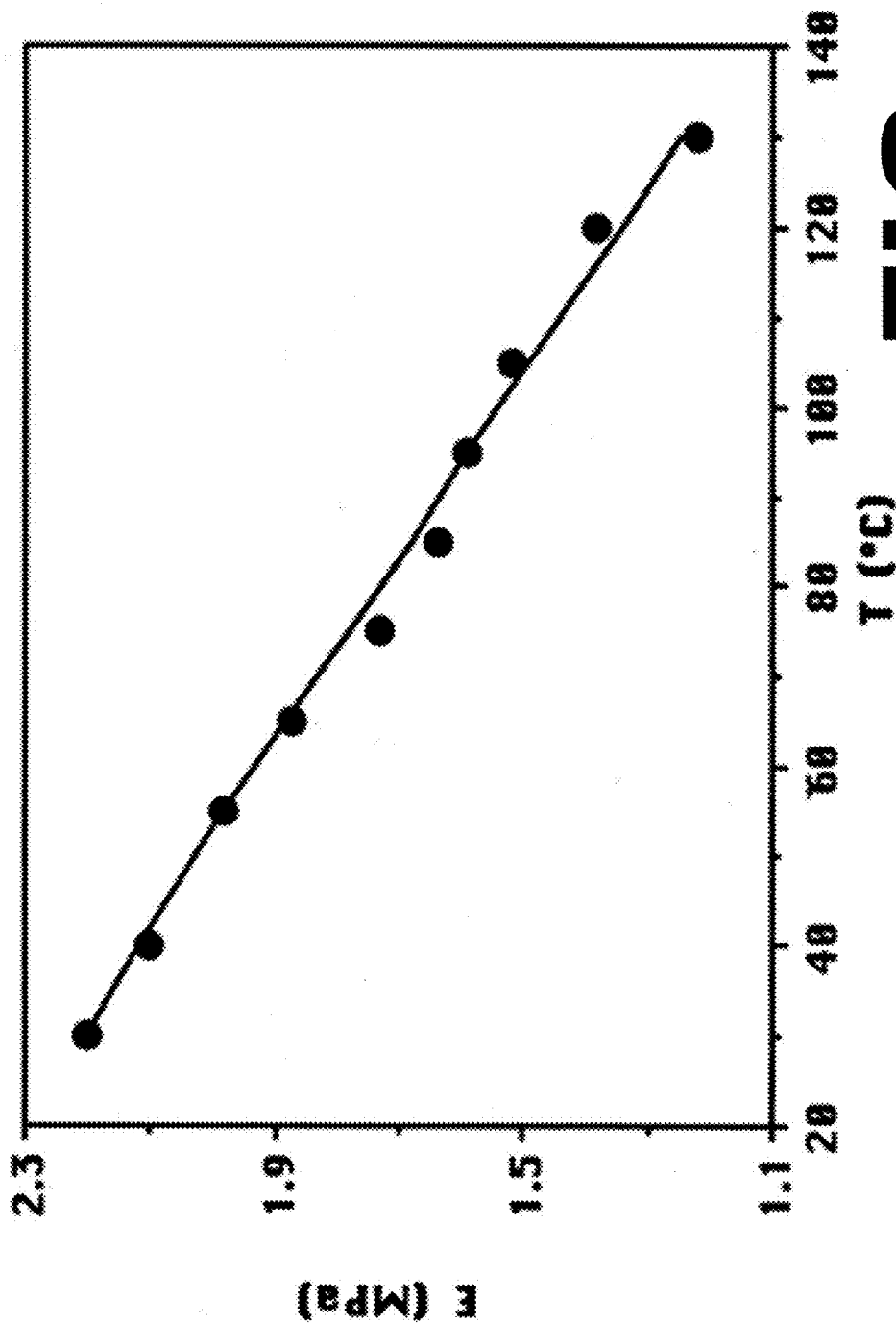
FIG. 4 is a chart showing elastic modulus at full conversion as a function of cure temperature for the coating of FIG. 3.

Attention is now turned to FIG. 3, which shows conversion (or cure) in a film of an illustrative acrylate-based primary coating as a function of ultraviolet (UV) irradiation time at different temperatures, and FIG. 4, which shows elastic modulus at full conversion as a function of cure temperature. In FIG. 3, the data are normalized to have a value of 1.0 at full conversion. As those having skill in the art can appreciate, one goal during fiber draw is to achieve a relatively low primary coating modulus, in order to minimize microbending and achieve low optical attenuation of the fiber. At the same time, another goal is to achieve full conversion (or full cure), thereby avoiding any significant UV-induced increases in modulus after the fiber draw process. Therefore, a combined goal is to achieve low P-ISM at full cure. Another goal is to achieve a high rate of conversion versus time (high cure speed). However, as shown in FIGS. 3 and 4, higher conversion (meaning a more completely cured coating) requires higher doses of UV radiation and occurs more rapidly at low cure temperatures, while lower P-ISM results from higher cure temperatures due to the higher activation energy of chain-transfer reactions.

To obtain lower P-ISM, inline heaters or heat lamps can be installed in the fiber draw towers, thereby actively heating the optical fibers during draw and, consequently, lowering P-ISM by favoring chain transfer reactions. The inline heaters or heat lamps permit the coating 130, 140 to be cured during draw at temperatures that exceed 100 degrees Celsius (100° C.) or 150° C. Broad spectrum UV lamps (which also emit infrared radiation) can also act as inline heaters in addition to providing higher UV dose for curing. To avoid sacrificing line speeds (or draw speeds), some embodiments of the coating 130, 140 comprise a primary photoinitiator (photoinitiator package in the primary coating) that absorbs light in a primary wavelength range ($\lambda$1) (and possibly some other wavelength ranges) and a secondary photoinitiator (photoinitiator package in the secondary coating) that absorbs light in a secondary wavelength range ($\lambda$2) (and possibly some other wavelength ranges). For some embodiments, $\lambda$1 is in one range (e.g., between approximately 365 nanometers (nm) and approximately 405 nm (~365 nm<λ1<~405 nm)) while λ2 is in a different range (e.g., less than approximately 360 nanometers (~300 nm<λ2<~360 nm)).

It should be appreciated that, for some embodiments, the secondary coating has a transmission window in the λ1 wavelength range. In other words, the secondary coating permits substantial transmission of λ1 wavelengths. The substantial transmission in λ1 allows further curing of the primary coating through the secondary coating. Thus, although both the primary coating and the secondary coating can absorb in the λ2 wavelength range, curing of the primary coating occurs mainly in the λ1 wavelength range.

For some embodiments, the primary coating 130 includes one or more chain transfer agents that affect the P-ISM as a function of temperature during cure. In particular, the chain transfer agents help to reduce P-ISM during cure as the fiber is drawn at full manufacturing line speeds. By way of example, incorporating a chain transfer agent (of approximately 0.001 weight percent (~0.001 wt %) to ~5 wt % in the primary coating permits the optical fiber to be drawn at full manufacturing line speeds (e.g., approximately 37 meters-per-second (m/s)) while still being coated with a primary coating that has an ISM value of less than 0.45 megapascals (MPa). In some embodiments, the chain transfer agent comprises a mercapto-containing compound. In further embodiments, the mercapto functionality may be embedded within and distributed along the structure of an oligomeric component.

Figure 5:
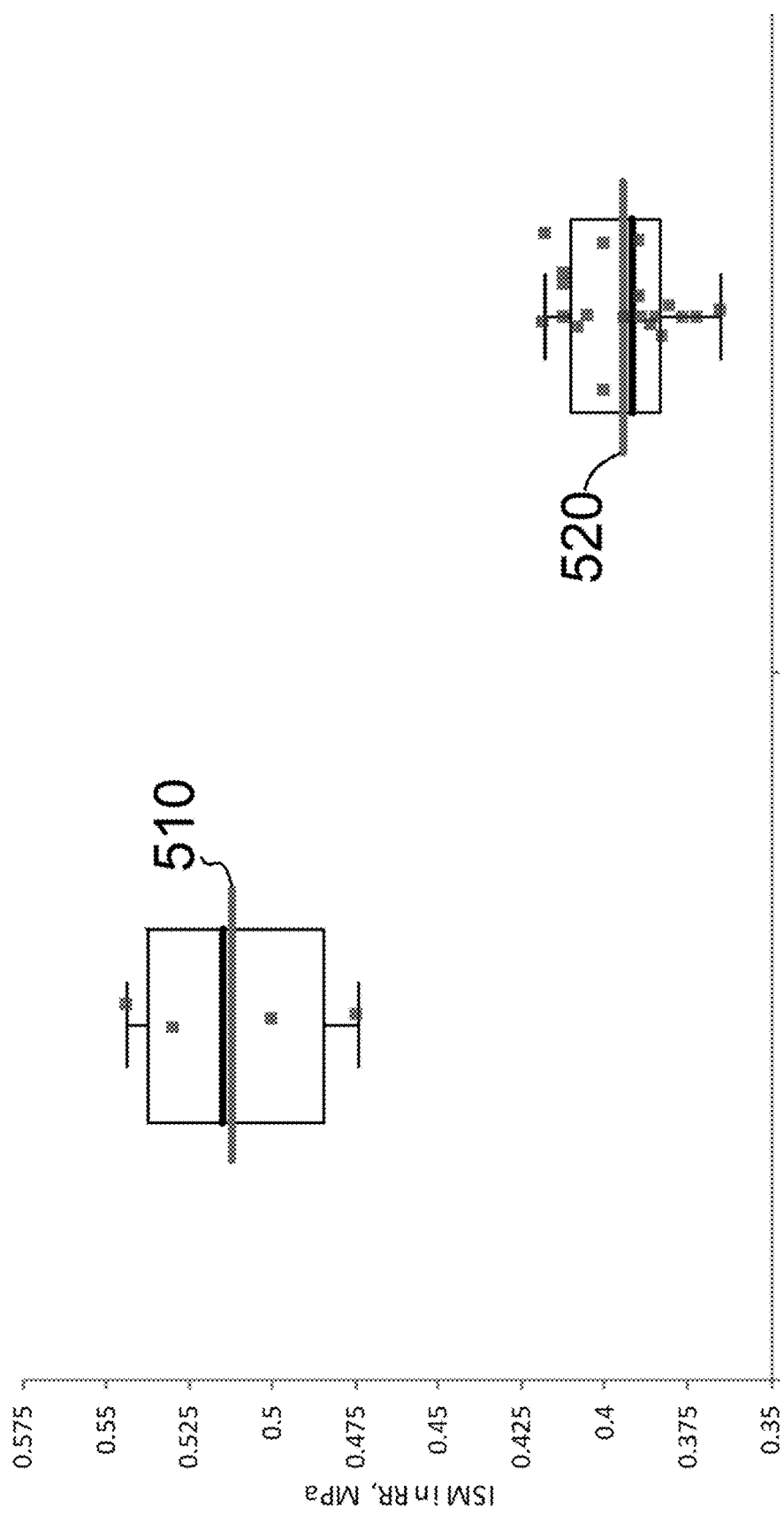
FIG. 5 is a graph showing a comparison between primary coating in situ modulus (ISM) of conventional optical fibers and ISM of some embodiments of the inventive optical fibers after they have gone through the rollable ribbon manufacturing process.
Figure 6:
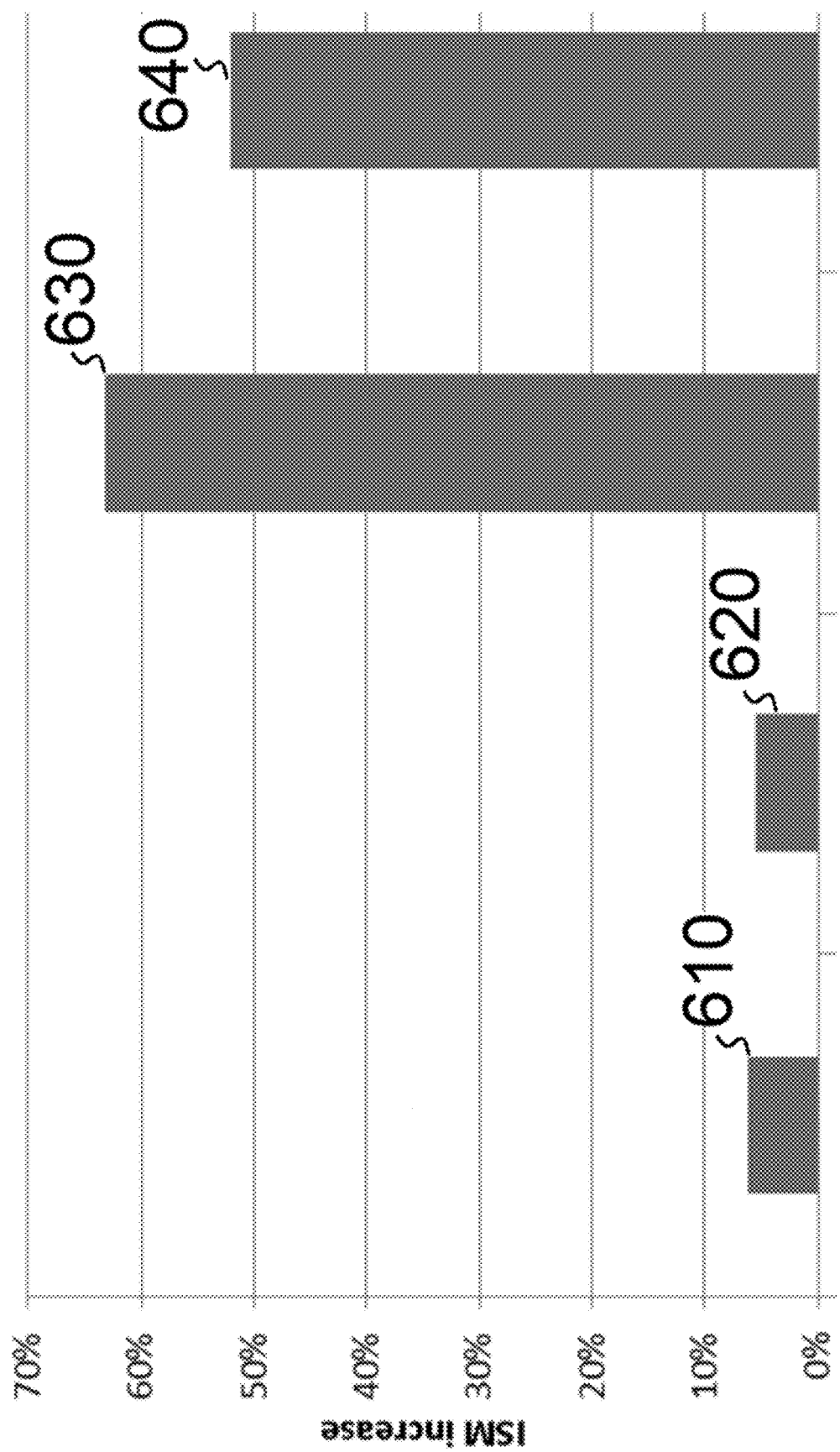
FIG. 6 is a graph showing a comparison between primary coating ISM increase for some embodiments of the inventive optical fibers and ISM increase for some conventional optical fibers, where the percent increase is measured after off-line (post-draw) exposure of the as-drawn fibers to a UV dose of approximately five hundred millijoules-per-square centimeter ($\sim$500 mJ/cm$^2$) (which represents a simulation of the RR process).

Having described several embodiments in which the coatings on optical fibers are more-fully cured during draw, attention is turned to FIGS. 5 and 6, which compare the embodiments described above with conventional coatings on optical fibers. It should be noted here that the same primary coating composition was used to coat the fibers for the embodiments shown in FIGS. 5 and 6.

Specifically, FIG. 5 shows a comparison between the P-ISM of conventional optical fibers 510 and the P-ISM of several inventive optical fibers 520. Specifically, the values in FIG. 5 represent P-ISM in RR, that is, for fibers that have been exposed to additional UV after draw during offline coloring and RR processes. As such, FIG. 5 shows advantages of the disclosed embodiments as compared to corresponding conventional processes without the added UV lamps. As shown in FIG. 5, the P-ISM for conventional optical fibers 510 (which have not been exposed to the additional UV radiation and/or heat during draw) exceeds approximately 0.475 MPa. Specifically, FIG. 5 shows the mean P-ISM in RR of the exemplary conventional optical fibers 510 to be approximately 0.51 MPa. Comparatively, the P-ISM in RR for the inventive optical fibers 520 (which are exposed to additional UV radiation during draw) is below 0.45 MPa, with the mean P-ISM value being approximately 0.38 MPa.

FIG. 6 further shows how the P-ISM differs when the optical fiber coatings are exposed to UV radiation after the fiber draw process (sometimes designated as "cold cure"). Specifically, FIG. 6 shows two (2) examples of P-ISM increase for the inventive optical fibers 610, 620 compared to two (2) examples of P-ISM increase for conventional optical fibers 630, 640. In particular, FIG. 6 shows the behavior of the coatings when exposed to a dose of UV radiation of approximately five hundred millijoules-per-square-centimeters (~500 mJ/cm$^2$) after the fiber draw process. Specifically, an optical fiber was exposed to additional UV in a laboratory environment by passing the fiber under a UV oven equipped with an iron-doped mercury UV bulb (D-type, 400 W/inch maximum power) using a conveyor belt. The lamp power and conveyor belt speed were set so as to achieve a UV dose of ~500 mJ/cm$^2$ as measured using a calibrated IL390B Series Compact Radiometer.

As shown in FIG. 6, both the conventional optical fibers 630, 640 and the optical fibers that were more-fully converted 610, 620 (or further cured during the fiber draw process) exhibit an increase in P-ISM. However, the conventional optical fibers 630, 640 exhibit a relatively large increase in P-ISM of approximately fifty-two percent (~52%) or ~63%, while the inventive optical fibers exhibit a relatively small increase in P-ISM of less than 15% (e.g., ~5% to ~6%).

As one can appreciate from FIGS. 1 through 6, adverse effects that are caused by changes in the P-ISM are mitigated by more-fully curing the coatings on the optical fibers during the draw process, thereby resulting in coatings that are cured to at least 85% of their fully-cured P-ISM values. Consequently, when the inventive optical fibers are exposed to additional UV radiation, for example, during the manufacture of rollable ribbons, their P-ISM values are relatively stable and increase by less than 15%. The relatively small change in P-ISM makes the optical fiber less sensitive to microbending losses in the cable and, thus, improves optical fiber performance (e.g., in rollable ribbon (RR) fiber-optic cables).

Those having skill in the art will appreciate that one of the main areas of interest for the disclosed embodiments is for glass optical fibers having a glass outer diameter (OD) of approximately 125 micrometers (~125 μm), with dual-layer UV-curable acrylate coatings, which are drawn vertically for use in rollable ribbons or other high-density cable structures, to optimize low attenuation. Such areas include fibers that are colored during the draw process (e.g., color in the secondary coating) or colored offline by applying a tertiary colored layer in a separate process. It should be appreciated that the optical fibers include single-mode fibers, multimode fibers, fibers drawn wet-on-wet (WOW), fibers drawn wet-on-dry (WOD), etc. Here, WOW is known in the art as a process where both primary and secondary coatings are applied together as co-concentric liquids surrounding the glass fiber before they are cured; WOD refers to a process wherein the liquid primary coating is first applied to the glass and is UV exposed to impart cure prior to application of the liquid secondary coating (which is itself then UV exposed).

For other embodiments, the optical fibers include specialty fibers that are not colored (but which have various unconventional geometries based on other glass outer diameters (OD), other special optical core types, or other glass structures, including polarization-maintaining (PM) fibers incorporating stress rods or hollow-core fiber (HCF) or multicore fiber (MCF) or shapes such as rectangular-, octagonal-, hexagonal-, or star-shaped cross-sectional profiles.

In yet other embodiments, the optical fibers include fibers that are susceptible to downstream exposure to UV light (e.g., outdoor field-termination cabinets, fluorescent indoor lighting, UV-exposure applications (such as sterilization), etc.), where relative stability of the P-ISM to UV light is either needed or desired.

Those having skill in the art will also understand that the fibers need not be drawn vertically but, for other embodiments, can be drawn horizontally (e.g., using air sheaves).

For purposes of clarity, it should be understood that in situ modulus (ISM) designates a modulus that is measured on the fiber (rather than modulus measured on a polymer film). As such, ISM can be measured using, for example, the processes described in U.S. Patent Publication Number 20110188822A1 or U.S. Pat. No. 6,215,934, or other processes that are well-understood by those having skill in the art. Furthermore, those having skill in the art will appreciate that the secondary-coating in situ modulus (S-ISM) can be controlled in a manner that is similar to how the P-ISM is controlled.

Any process descriptions or blocks in flow charts should be understood as being executable out of order from that shown or discussed, including substantially concurrently or in reverse order, depending on the functionality involved, as would be understood by those reasonably skilled in the art of the present disclosure.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. A rollable-ribbon (RR) fiber-optic cable, comprising:
   optical fibers arranged in a predetermined array, each optical fiber comprising:
   a core;
   a cladding disposed about the core; and
   a primary coating disposed about the cladding during an optical fiber draw process, the primary coating being disposed at a draw speed of at least thirty meters-per-second (30 m/s), the primary coating being ultraviolet light (UV) cured to a primary-coating in situ modulus (P-ISM) value of less than 0.45 megapascals (MPa), the primary coating further being cured during the draw process to at least eighty-five percent (85%) of a fully cured P-ISM value, the primary coating being cured at a temperature that is greater than one hundred degrees Celsius (100° C.), the primary coating comprising a UV-curable acrylate-based composition, the UV-curable acrylate-based composition comprising between approximately 0.001 weight percent (~0.001 wt %) to approximately five (~5) wt % of a mercapto-containing compound, the primary coating comprising a primary photoinitiator prior to curing that absorbs light in a primary wavelength range (λ1) that is between approximately 365 nanometers (nm) and approximately 405 nm (~365 nm<λ1<~405 nm);
   a secondary coating disposed about the primary coating, the secondary coating comprising a secondary photoinitiator prior to curing that absorbs light in a secondary wavelength range (λ2) that is between approximately 300 nm and approximately 360 nanometers (~300 nm<λ2<~360 nm); and
   UV-curable adhesive disposed at predetermined locations in the array, the UV-curable adhesive flexibly adhering together adjacent optical fibers at the predetermined locations.

2. The RR fiber-optic cable of claim 1, the secondary coating being colored.

3. The RR fiber-optic cable of claim 1, further comprising a tertiary coating disposed about the secondary coating, the tertiary coating being colored.

4. An optical fiber, comprising:
   a core;
   a cladding disposed about the core;
   a primary coating disposed about the cladding at a draw speed of at least ten meters-per-second (10 m/s), the primary coating being ultraviolet light (UV) cured during draw, the primary coating being UV-cured to at least eighty-five percent (85%) of a fully UV-cured primary-coating in situ modulus (P-ISM) value; and
   a secondary coating disposed about the primary coating.

5. The optical fiber of claim 4, the secondary coating being colored.

6. The optical fiber of claim 4, further comprising a tertiary coating disposed about the secondary coating, the tertiary coating being colored.

7. The optical fiber of claim 4, the primary coating being disposed about the cladding at a draw speed of at least twenty meters-per-second (20 m/s).

8. The optical fiber of claim 4, the coating being disposed about the cladding at a draw speed of at least thirty meters-per-second (30 m/s).

9. The optical fiber of claim 4, the coating being disposed about the cladding at a draw speed of up to approximately fifty meters-per-second (~50 m/s).

10. The optical fiber of claim 4, the primary coating comprising a chain transfer agent.

11. The optical fiber of claim 10, the chain transfer agent being a mercapto-containing compound.

12. The optical fiber of claim 10, the primary coating comprising from approximately 0.001 weight percent (~0.001 wt %) to approximately five (~5) wt % of the chain transfer agent.

13. The optical fiber of claim 4, the primary coating having a P-ISM value that is less than 0.45 megapascals (MPa).

14. The optical fiber of claim 4, the coating being cured during draw at a temperature that is greater than one hundred degrees Celsius (100° C.).

15. The optical fiber of claim 4, the coating being cured during draw at a temperature that is greater than one hundred and fifty degrees Celsius (150° C.).

16. The optical fiber of claim 4, the primary coating comprising a photoinitiator that absorbs light in a primary wavelength range (λ1).

17. The optical fiber of claim 16, λ1 being between approximately 365 nanometers and approximately 405 nm (~365 nm<λ1<~405 nm).

18. The optical fiber of claim 16, the secondary coating comprising a photoinitiator that absorbs light in at least a secondary wavelength range (λ2), λ2 being different from λ1.

19. The optical fiber of claim 18, λ2 being between approximately 300 nanometers and approximately 360 nanometers (~300 nm<λ2<~360 nm).

20. The optical fiber of claim 16, the secondary coating substantially transmitting light in λ1.

* * * * *